(12) United States Patent
Dodballapur et al.

(10) Patent No.: US 10,440,313 B2
(45) Date of Patent: Oct. 8, 2019

(54) METHOD, SYSTEM AND APPARATUS FOR SPATIALLY ARRANGING A PLURALITY OF VIDEO FRAMES FOR DISPLAY

(71) Applicant: CANON KABUSHIKI KAISHA, Tokyo (JP)

(72) Inventors: Veena Murthy Srinivasa Dodballapur, Artarmon (AU); Belinda Margaret Yee, Balmain (AU); Ian Robert Boreham, Gordon (AU)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 15/360,401

(22) Filed: Nov. 23, 2016

(65) Prior Publication Data
US 2017/0171499 A1   Jun. 15, 2017

(30) Foreign Application Priority Data
Dec. 15, 2015   (AU) ................ 2015268735

(51) Int. Cl.
*G06K 9/00* (2006.01)
*H04N 5/915* (2006.01)
(Continued)

(52) U.S. Cl.
CPC ............. *H04N 5/915* (2013.01); *G06T 7/20* (2013.01); *H04N 5/91* (2013.01); *G06F 3/04842* (2013.01);
(Continued)

(58) Field of Classification Search
CPC . H04N 5/915; H04N 5/91; G06T 7/20; G06T 2207/10016; G06T 2207/20008; G06T 2207/30241; G06F 3/04842
See application file for complete search history.

(56) References Cited

U.S. PATENT DOCUMENTS 6,724,915 B1   4/2004  Toklu et al.
6,968,973 B2 * 11/2005  Uyttendaele ...... G06F 17/30056
                                                                221/2
(Continued)

FOREIGN PATENT DOCUMENTS

JP    2005-190140 A    7/2005
JP    2005-278140 A   10/2005
(Continued)

OTHER PUBLICATIONS

Correa, C.D., et al, "Dynamic video Narratives", In ACM SIGGRAPH 2010 papers (SIGGRAPH '10), Hugues Hoppe (Ed.). ACM, New York, NY, USA, Article 88, 9 pages.

*Primary Examiner* — Shefali D Goradia
(74) *Attorney, Agent, or Firm* — Canon U.S.A., Inc., IP Division

(57) ABSTRACT

A method and system for spatially arranging a plurality of video frames for display on a layout region is provided. The plurality of video frames are selected from a video sequence based on a determination of motion of an object within the video sequence. An image layout path is determined for the selected video frames. An anchor point is determined for each selected video frame based on a determination of motion of the object depicted in the video frame, each said anchor point locating a selected video frame with respect to the layout path. The selected plurality of video frames are spatially arranged on the layout region relative to the determined image layout path and in accordance with the determined anchor points.

24 Claims, 14 Drawing Sheets

(51) Int. Cl.
*G06T 7/20* (2017.01)
*H04N 5/91* (2006.01)
*G06F 3/0484* (2013.01)

(52) U.S. Cl.
CPC ............... *G06T 2207/10016* (2013.01); *G06T 2207/20008* (2013.01); *G06T 2207/30241* (2013.01)

(56) References Cited

U.S. PATENT DOCUMENTS

| | | | |
|---|---|---|---|
| 7,589,733 B2 | 9/2009 | Tanaka | |
| 7,760,956 B2 * | 7/2010 | Lin | G06K 9/00711 382/254 |
| 8,098,730 B2 | 1/2012 | Ma et al. | |
| 8,311,393 B2 | 11/2012 | Kawaoka | |
| 8,730,397 B1 | 5/2014 | Zhang | |
| 8,831,281 B2 | 9/2014 | Shellshear | |
| 9,081,484 B2 | 7/2015 | Han et al. | |
| 2005/0146526 A1 * | 7/2005 | Tanaka | G06T 11/60 345/441 |
| 2005/0195659 A1 * | 9/2005 | Tanaka | H04N 1/3873 365/49.1 |
| 2012/0219174 A1 * | 8/2012 | Wu | G06K 9/00711 382/103 |

FOREIGN PATENT DOCUMENTS

| | | | |
|---|---|---|---|
| JP | 2006-279939 A | 10/2006 | |
| JP | 2008-276410 A | 11/2008 | |

* cited by examiner

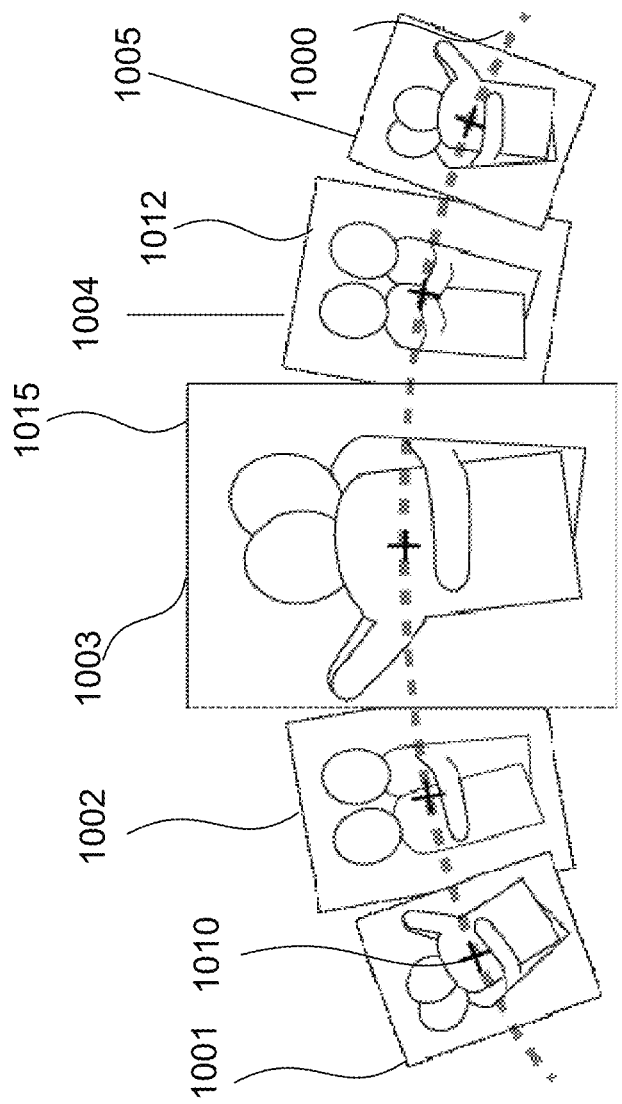

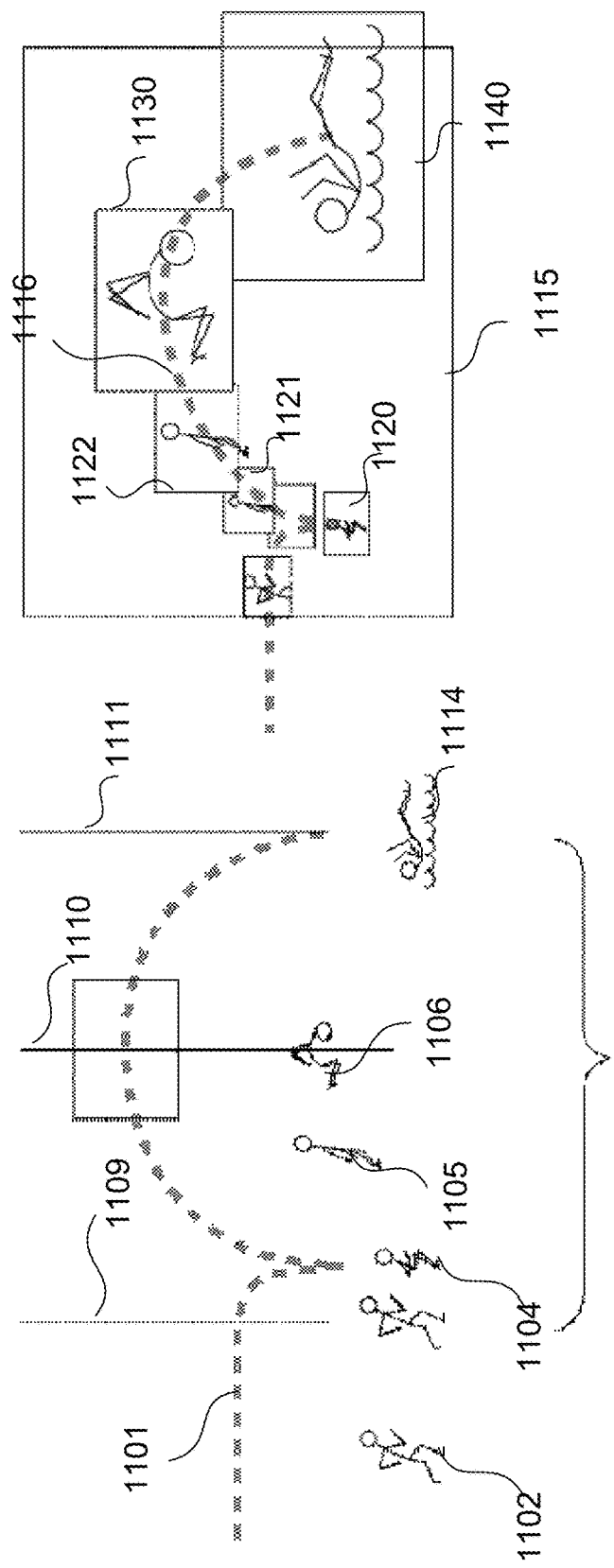

METHOD, SYSTEM AND APPARATUS FOR SPATIALLY ARRANGING A PLURALITY OF VIDEO FRAMES FOR DISPLAY

REFERENCE TO RELATED PATENT APPLICATION

This application claims the benefit under 35 U.S.C. § 119 of the filing date of Australian Patent Application No. 2015268735, filed Dec. 15, 2015, hereby incorporated by reference in its entirety as if fully set forth herein.

FIELD OF INVENTION

The present invention relates to creating a photo book layout for video frames, by considering the motion of objects in a video. The present invention also relates to a method, system and apparatus for arranging a plurality of video frames for display, and to a computer program product including a computer readable medium having recorded thereon a computer program for arranging a plurality of video frames for display.

DESCRIPTION OF BACKGROUND ART

Videos of events such as weddings and travel are captured using devices such as cameras, smartphones and camcorders. The videos may vary in length, and often need to be combined to tell the whole story of the event. Sometimes, the combined videos can be long and time-consuming to watch. One method of providing a quick summary or storytelling of an event is to create a photo book using frames taken from the video. However, photo books generally do not provide a natural sense of the motion present in the video, as it would require many frames to do so using conventional methods, especially to represent a complex motion.

Additionally, if there are too many frames, it is difficult to fit the frames into a page, such as an A4 page. Hence, most layouts focus on the aesthetics of the photo book, or depict only simple motion.

In one conventional method, images are arranged in a photo book using pre-defined layouts, where the pre-defined layouts are based on time and direction, where the layout is characterised by a path with pre-defined arrangement points. The arrangement points are also characterised by time or direction. In this photo book method, the images are arranged along the path by matching time/direction information extracted from the images with the time/direction information associated with the arrangement points. However, in such a method, the disadvantage is that the layout paths have to be pre-defined. Also, the method can be used only to describe simple motion, and layout does not change based on the local motion characteristics.

In a second conventional method, a mosaicing system is used to generate visual narratives from videos depicting the motion of one or more actors. In this second known method the foreground and background regions of video frames are composited to produce a single panoramic image, using a series of spatio-temporal masks. The user selects the frames to create a linear panoramic image. However, in this method, even though the images on the layout path indicate motion, there is the disadvantage that user has to select layout path and images to create a panoramic image. In addition, the panoramic image is linear and requires many frames to express a complex motion.

In third conventional method, a graphical user interface is provided to select the page size, decisive frames (i.e., frames that are salient in an action sequence that is characterised by sudden motion changes) and frames surrounding the decisive frame. A template is used in this third conventional method and frames are made to fit the template. However, this third method, like the other methods described above, has the disadvantage that the selection of the layout path is not dynamic. The placement of images on the layout path is also not dynamic. The layout path and the image characteristics do not express the motion.

A similar problem occurs when trying to represent the track of a moving object, such as a person, in a video summary image. In one method, images of the moving objects or blobs representing the objects are shown with varying opacities on the object track. The opacities may combine due to the actions of the object, such as moving or stopping. This varying opacity method has the advantage that the layout path is dynamic and the blobs on the layout path show motion. However, adapting this varying opacity method to a photo book, by using the video frames in place of the moving object images or blobs would produce just a single image showing a simple motion. In addition, with the varying opacity method, it is difficult to show all the blobs' characteristics at every track position, in a single image.

Thus, it is difficult to express motion in a photo book page layout, when laying out video frame images.

SUMMARY

It is an object of the present invention to substantially overcome, or at least ameliorate, one or more disadvantages of existing arrangements.

According to one aspect of the present disclosure, there is provided a method for spatially arranging a plurality of video frames for display on a layout region. The method includes selecting the plurality of video frames from a video sequence based on a determination of motion of an object within the video sequence; determining an image layout path for the selected video frames; determining an anchor point for each selected video frame based on a determination of motion of the object depicted in the video frame, each said anchor point locating a selected video frame with respect to the layout path; and spatially arranging the selected plurality of video frames on the layout region relative to the determined image layout path and in accordance with the determined anchor points.

According to another aspect of the present disclosure, there is provided a system for spatially arranging a plurality of video frames for display on a layout region. The system includes a memory for storing data and a computer program and a processor coupled to the memory for executing the computer program. The computer program has instructions for selecting the plurality of video frames from a video sequence based on a determination of motion of an object within the video sequence; determining an image layout path for the selected video frames; determining an anchor point for each selected video frame based on a determination of motion of the object depicted in the video frame, each said anchor point locating a selected video frame with respect to the layout path; and spatially arranging the selected plurality of video frames on the layout region relative to the determined image layout path and in accordance with the determined anchor points.

According to still another aspect of the present disclosure, there is provided a computer readable medium having a computer program stored on the medium for a method of spatially arranging a plurality of video frames for display on a layout region. The method includes selecting the plurality of video frames from a video sequence based on a determination of motion of an object within the video sequence; determining an image layout path for the selected video frames; determining an anchor point for each selected video frame based on a determination of motion of the object depicted in the video frame, each said anchor point locating a selected video frame with respect to the layout path; and spatially arranging the selected plurality of video frames on the layout region relative to the determined image layout path and in accordance with the determined anchor points.

According to another aspect of the present disclosure, there is provided a method for spatially arranging a plurality of video frames for display on a layout area. The method includes selecting the plurality of video frames from a video sequence based on a determination of motion of an object within the video sequence; determining an image layout path for the video frames; determining a frame display characteristic for each of the selected video frames dependent on the irregularity of the motion; and spatially arranging the selected plurality of video frames on the layout region relative to the determined image layout path and in accordance with the determined frame display characteristics.

According to another aspect of the present disclosure, there is provided a method for spatially arranging a plurality of video frames for display on a layout region. The method includes selecting a plurality of video frames from a video sequence based on a determination of motion of an object within the video sequence; determining a motion path of an object in the video; modifying the shape of the motion path to create a layout path, wherein the modification is based on a shape characteristic of the motion path; and spatially arranging the selected plurality of video frames relative to the determined image layout path, said video frames being positioned with respect to the relative motion of the object within the video frames.

Other aspects of the invention are also disclosed.

BRIEF DESCRIPTION OF THE DRAWINGS

One or more embodiments of the invention will now be described with reference to the following drawings, in which:

FIG. 10A shows an example of video frames spatially arranged on a layout path;

FIG. 11A and FIG. 11B show generation of a layout for a diving scenario;

DETAILED DESCRIPTION INCLUDING BEST MODE

Figure 1:
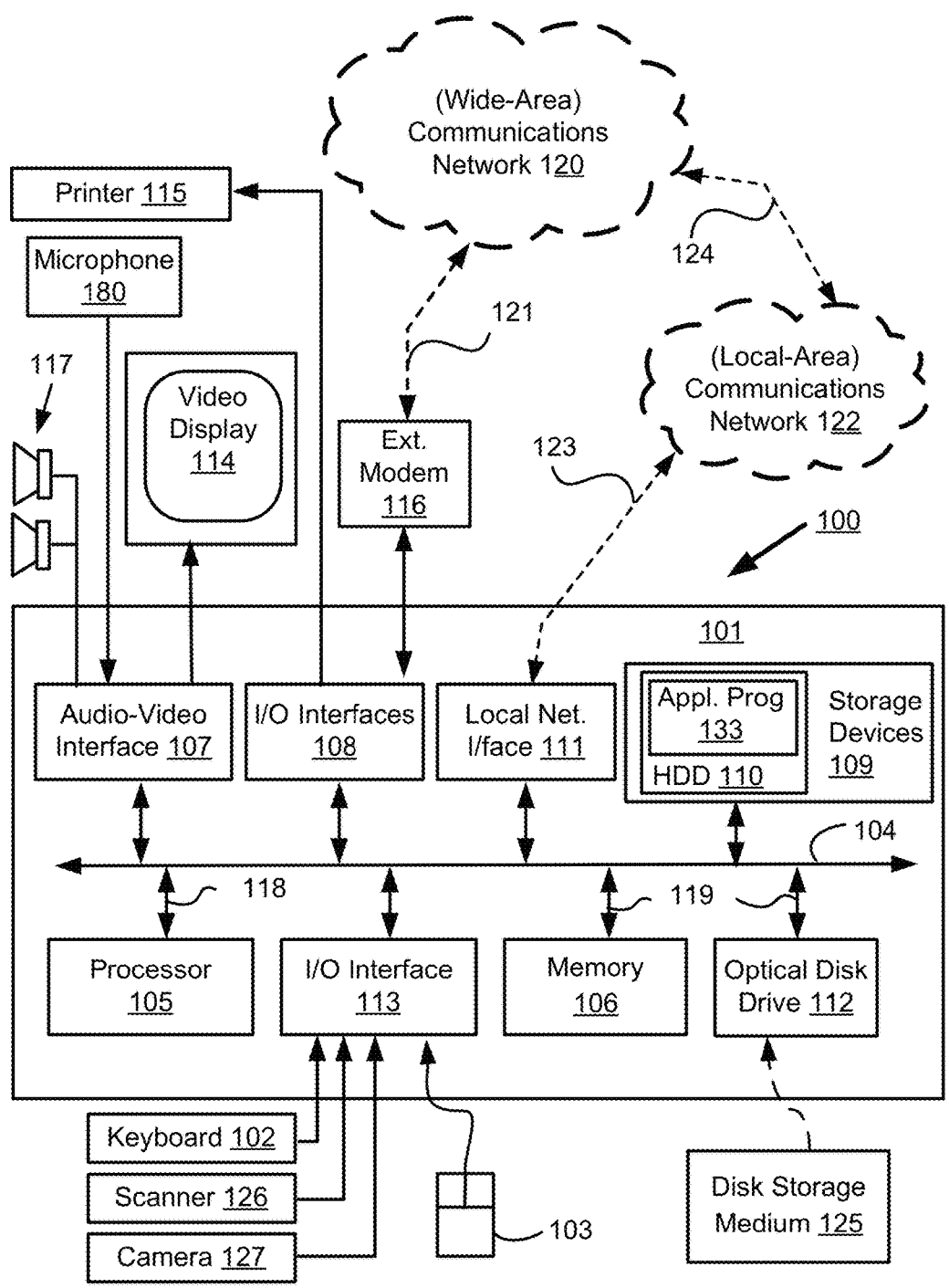
FIGS. 1 and 2 form a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

The present disclosure is directed towards providing a method of creating a photo book layout by considering motion in video. As described in detail below, relevant video frames are extracted from a video stream and a photo book is created from the extracted frames and laid out in a layout area, to express the temporal aspect of the video.

A frame region is a collection of decoded frames of a video. The decoded frames may be all the frames from a video, or a subset of frames from the video. The subset of frames may be part of an event such as a wedding event, part of an action such as blowing out candles at a birthday party, part of a predefined motion pattern such as skiing. Alternatively, the frames may be images, which are separated by shot boundaries; or the frames may be frames selected for their image quality, e.g., frames which are not blurry. As another example, the frames may be frames which have certain properties (e.g., frames which contain certain people, or frames with faces, or frames with certain behaviours such as smiling).

A motion path or global motion path of a key object in the video frames represents a shape characteristic of the motion trajectory of that object in the video frames, relative to the scene. A local motion path is part of the global motion path, which describes only part of the motion of the key object.

Motion characteristics are characteristics such as speed, direction, and randomness of motion (entropy) of the key object. Global motion characteristics are the motion characteristics of the key object for the whole motion path. Local motion characteristics are the motion characteristics analysed for only part of the motion path, generally around a salient frame. The salient frame is a frame having certain characteristics such as sudden changes in motion, or behaviour characteristics (e.g., a person falling or a person smiling). A frame display characteristic may be dependent on irregularity of the motion of the object.

A layout region is the region, such as an A4 page, or an area in a page, where the layout path and video frames are to be laid out.

Frame characteristics are attributes of laid-out frames, such as size, angle of rotation, and colour.

A layout path is a geometrical entity used to determine the locations at which frames will be laid out. A global layout path is the layout path for all frames to be laid out in a layout region. The global layout path is composed of local layout paths. The layout paths are adapted from corresponding motion paths, and are exaggerated or modified based on the motion characteristics, layout region and number of frames. A local layout path is a segment of the global layout path, corresponding to a local motion path and local motion characteristics.

A layout is the final layout of the frames (i.e., with their frame characteristics) on a layout path within a layout region.

An anchor point is a position on a layout path used to determine the layout of a single frame.

Figure 2:
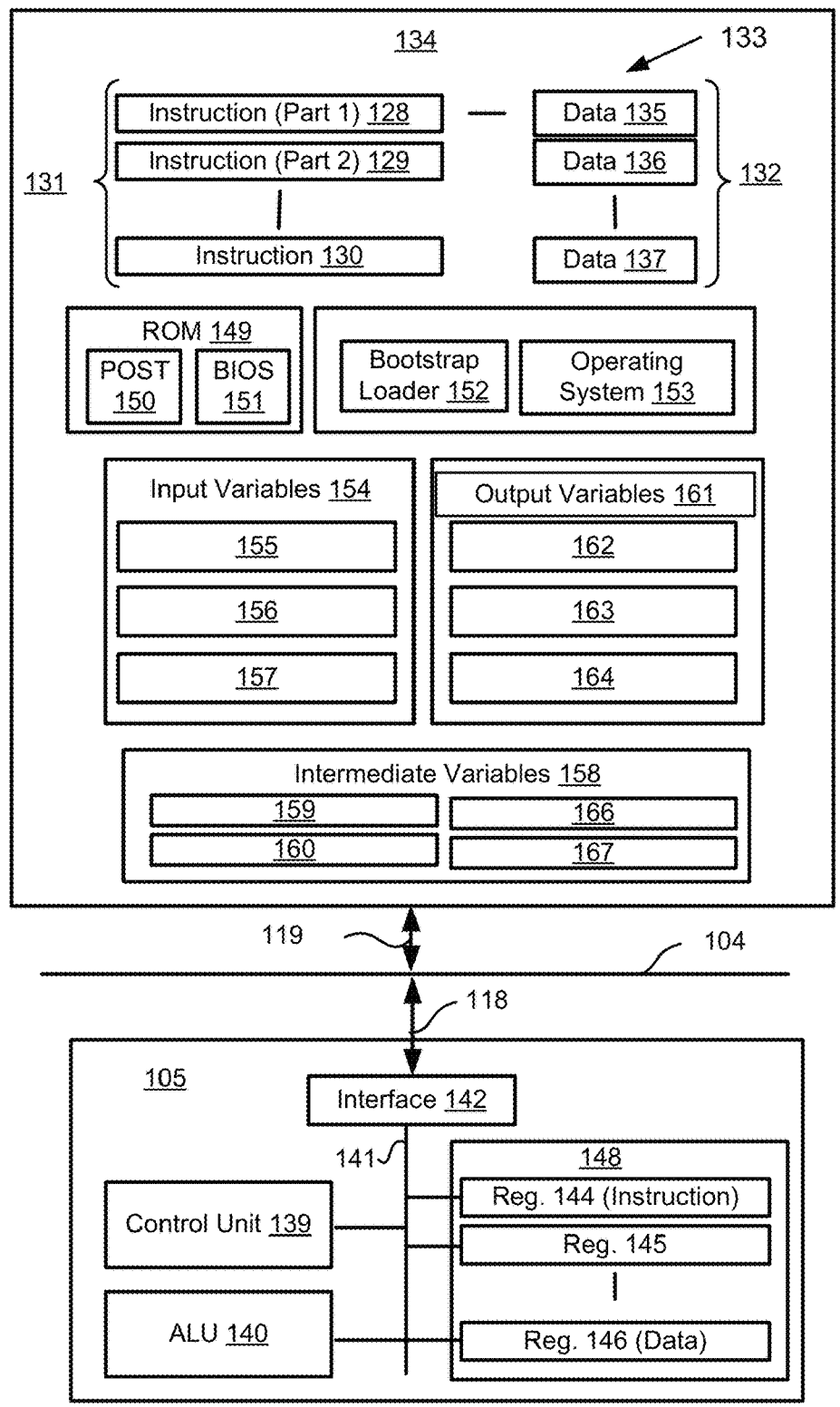

FIGS. 1 and 2 depict a general-purpose computer system 100, upon which the various arrangements described can be practiced.

As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Methods described below may be implemented using the computer system 100 wherein the processes of FIGS. 3 to 12, to be described, may be implemented as one or more software application programs 133 executable within the computer system 100. In particular, the steps of the described methods are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3 to 12 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of described methods. Such dedicated hardware may include graphic processors, digital signal processors, or one or more microprocessors and associated memories.

Figure 3:
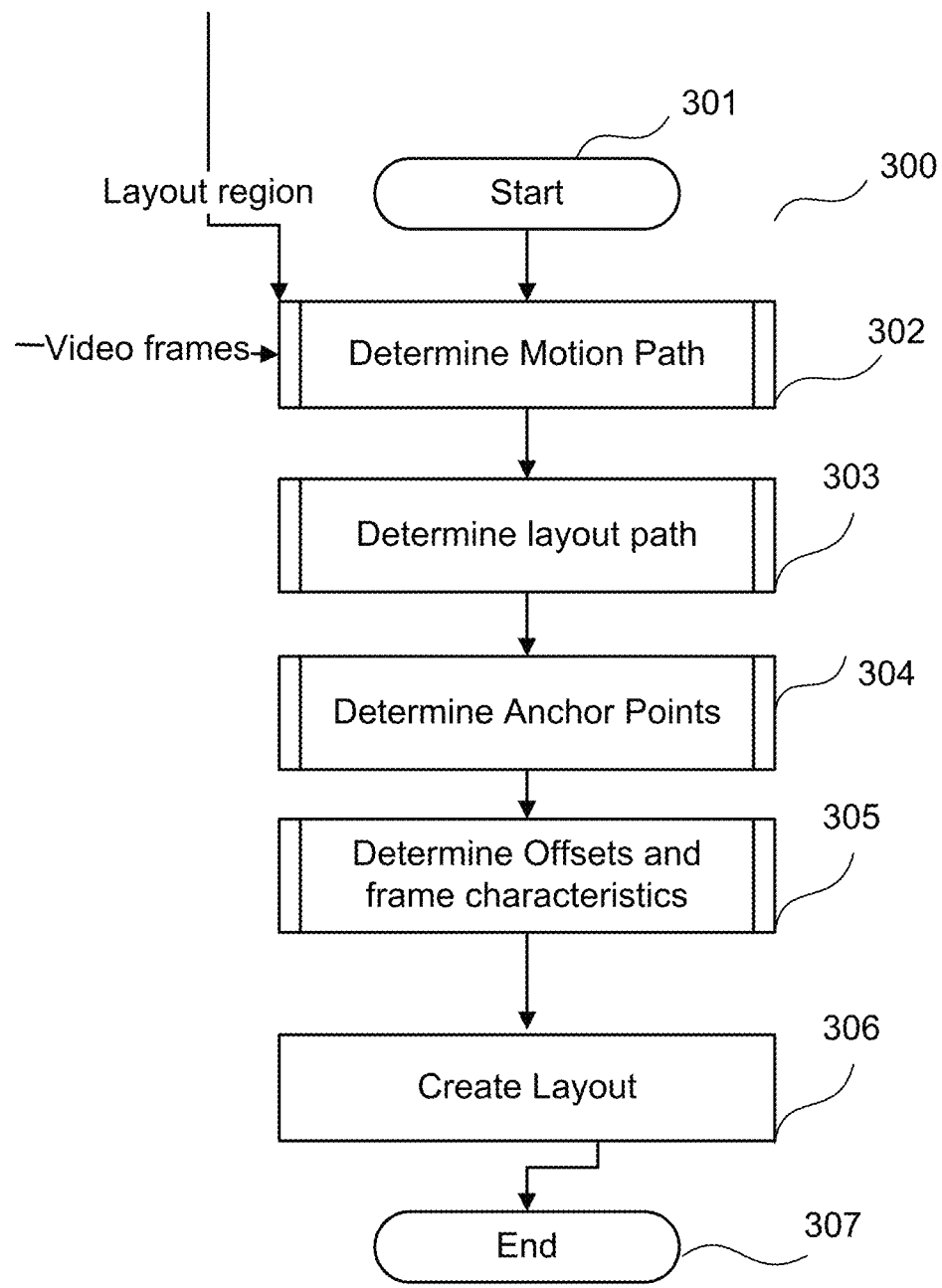
FIG. 3 is a flow diagram showing a method of spatially arranging a plurality of video frames for display on a layout region.

FIG. 3 is a flow diagram showing a method 300 of spatially arranging a plurality of video frames for display on a layout region. The method 300 may be used to create a photo book layout from the video frames.

Figure 8A:
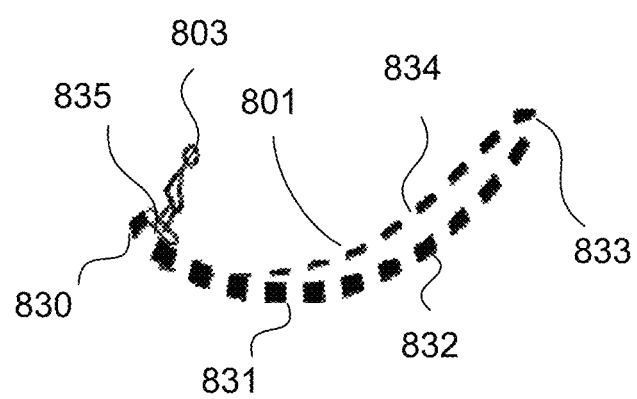
FIG. 8A shows an example of a motion path.

The method 300 will be described by way of example with reference to FIGS. 8A and 8B.

The method 300 may be implemented as one or more software code modules of the software application program 133 resident in the hard disk drive 110 being controlled in its execution by the processor 105. The inputs to the method 300 include images corresponding to video frames obtained from decoding a video sequence. The inputs to the method 300 also include a layout region on which the images are to be laid out. Each of the decoded video frames is an image in a format such as JPEG, TIFF, or PNG.

The method 300 begins at motion path determining step 302, where the motion path of a foreground object or objects is determined under execution of the processor 105. A method 400 of determining a motion path, as executed at step 302, will be described in detail below with reference to FIG. 4. The determined motion path may be stored in the memory 106.

The output of step 302 is a 2-dimensional path of the foreground object or objects. For example, FIG. 8A shows a motion path 801 of foreground object 803 (i.e., a skateboarder) representing global and local motion characteristics of the object. FIG. 8A also shows locations (830-835) of the foreground object 803 on the path 801.

The method 300 continues at layout path determining step 303, where a layout path is determined under execution of the processor 105. A method 500 of determining the layout path, as executed at step 303, will be described in detail below with reference to FIG. 5. The determined layout path may be stored in the memory 106.

In step 303, the layout path is generated from the motion path determined at step 302. The shape of the motion path may be modified to create the layout path, the modification being based on a shape characteristic of the motion path.

As described below, the layout path may be further modified to suit the layout region and a selected number of video frames of the decoded video sequence. The method 500 is executed at step 303 to perform the step of selecting a plurality of video frames to be laid out representing a subset of the input video frames from the decoded video sequence. The video frames are selected based on a determination of the motion of the foreground object within the video sequence. The layout path is determined for the selected video frames.

The inputs to step 303 are the motion path (e.g., 801), motion characteristics output by step 302 and the images corresponding to the video frames of the decoded video sequence. The inputs to step 303 also include the layout region in the form of dimensions of a layout page including width (e.g., 210 mm) and height (e.g., 297 mm) on which the layout is to be generated. In the example of FIG. 8B, the outputs of step 303 are a 2-dimensional layout path 816 in layout region 802, and a subset of the video frames in the form of images 820, 821, 822, 823, 824 and 825.

The method 300 continues at anchor point determining step 304, where anchor points for each of the selected video frames (e.g., 820, 821, 822, 823, 824 and 825) output by step 303. The anchor points are determined based on a determination of motion of the foreground object depicted in each video frame, each anchor point locating a selected video frame with respect to the layout path. The position of anchor points on the layout path (e.g., 816) is determined from the motion characteristics, the number of frames and the layout paths (global and local). A method 600 of determining anchor points, as executed at step 304, will be described in detail below with reference to FIG. 6. The output of step 304 is the positions of the determined anchor points. The determined positions may be stored in the memory 106. The layout path 816 of FIG. 8B includes the path following the anchor points 810-815.

Then at offset determining step 305, the offsets and frame characteristics of the frames (e.g., 820, 821 and 822, 823, 824 and 825) are determined under execution of the processor 105 and stored in the memory 106. The inputs to step 305 are the video frames (e.g., 820, 821 and 822, 823, 824 and 825), anchor points (e.g., anchor points 810-815), global layout path, local layout paths and the layout region (e.g., 802). A method 700 of determining offsets and frame characteristics, as executed at step 305, will be described in detail below with reference to FIG. 7. At step 305, the offsets from the anchor points, where the frames are to be placed, and the frame characteristics are determined from the motion characteristics, for example, regularity of motion.

The method 300 concludes at layout creating step 306, where a layout of the photo book is created by spatially arranging the selected video frames (e.g., 820, 821 and 822, 823, 824 and 825) for display on the layout region (e.g., 202). The created layout comprises the determined layout path defined on the layout page. The selected video frames are arranged relative to the determined layout path in accordance with the determined anchor points, with the video frames being defined at offsets from the anchor points. The layout also comprises the frame characteristics.

As described below, the selected video frames may be arranged at step 306 in accordance with a determined frame display characteristic. The frame display characteristic may be one or more of the group comprising: relative size of a frame, angle of rotation of the frame, transparency of the frame, hue of the frame, saturation of the frame, offset of the frame from layout path, distortion of the frame, cropping of the frame and contrast of the frame. Each of the video frames may be positioned with respect to the relative motion of the object in the video frames. Further, the described methods may be configured for adjusting one or more frame display characteristics based on irregularity of the motion of the object.

Figure 8B:
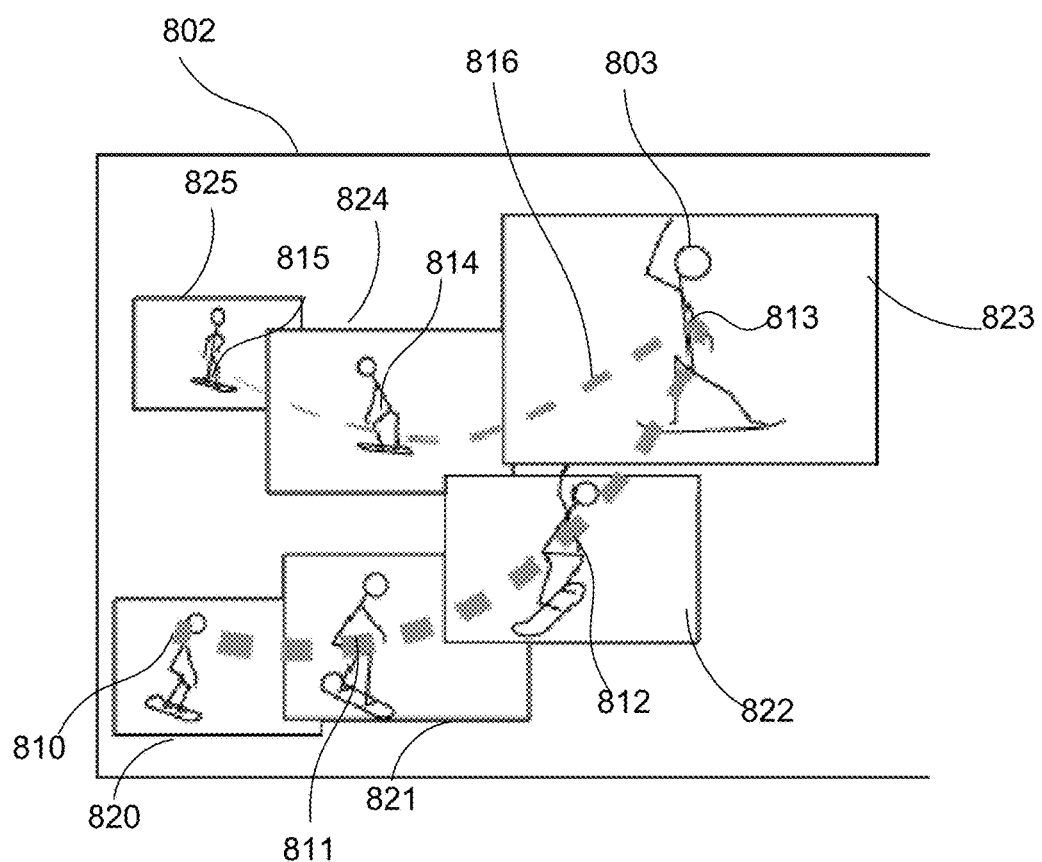
FIG. 8B shows a layout determined for the motion path FIG. 8A.

FIG. 8B is an example of a layout created in accordance with step 306. In the example of FIG. 8B, layout region 802 is the layout region which has the layout path 816. The size of each of the video frames 820-825 is modified based on the motion of the object (i.e., a skateboarder 803) as represented by the motion characteristics. For example, frame 813 has the biggest size because there is a sudden change in direction by the object (i.e., the skateboarder 803) at that point. All the video frames 820-825 are placed at the anchor points 810-815. Further, the overlap between the arranged video frames may be determined based on the motion of the object. For example, as frame 813 has the biggest size due to the sudden change in direction by the object (i.e., the skateboarder 803) at that point, the frame 823 partially overlaps the frame 824.

Figure 4:
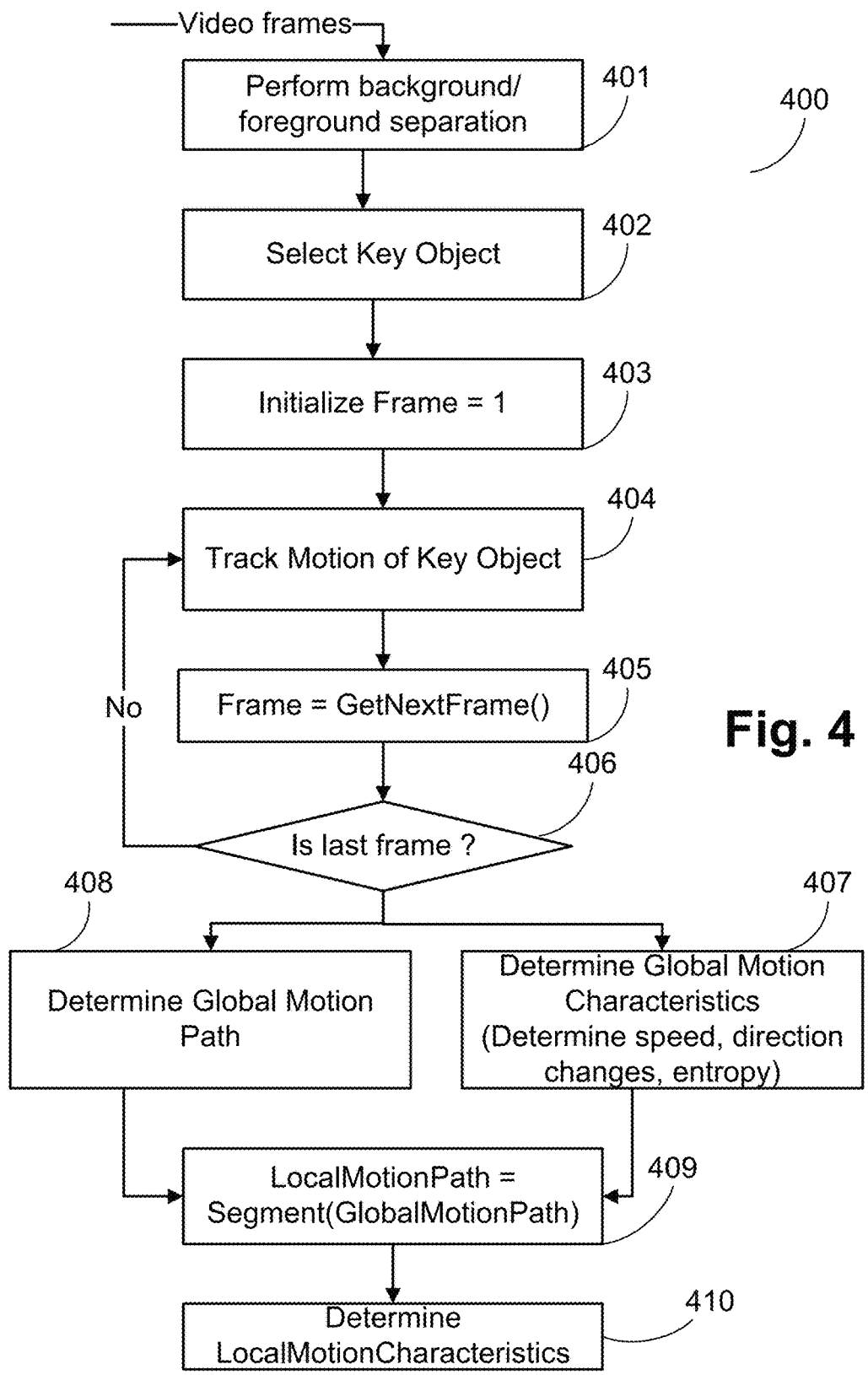
FIG. 4 is a flow diagram showing a method of determining a motion path.

The method 400 of determining a motion path, as executed at step 302, will now be described with reference to FIG. 4. The determined motion path represents the 2D trajectory of a foreground object in the video. The motion path is determined based on the trajectory of the foreground object.

The method 400 may be implemented as one or more software code modules of the software application program 133 resident in the hard disk drive 110 being controlled in its execution by the processor 105.

The input to the method 400 is the video frames obtained from decoding a video and the layout region on which the images are to be laid out.

The method 400 begins at separation step 401, where background/foreground separation is performed on the input video frames under execution of the processor 105. In one implementation, a reference frame which is robust to scene changes is determined from the input video frames, and a current frame is subtracted from the reference frame, to detect objects. In another implementation, a mixture of Gaussians method is used, where each pixel is modelled as a mixture of Gaussians. An on-line approximation is then used to update the model for background/foreground separation. A bounding box is defined for an object after the background/foreground separation. The output of step 401 is the bounding box for each foreground object.

Then at key object selecting step 402, a foreground object is selected as a key object. In one implementation, the key object is selected by checking the frequency of occurrences of the object in the video. For example, the object that is present in the greatest number of frames may be selected as the key object. In a second implementation, the user can define the key object by selecting the bounding box of the key object. In another implementation, an object having certain motion characteristics, such as a sudden change in direction or acceleration, is selected as the key object. The motion characteristics may be determined based on relative motion between the moving object and a still background. In another implementation, certain behaviour characteristics such as smiling or action such as falling, diving, or skateboarding are used to select the key object.

Once the key object is identified, the path of the object is determined. A geometric tracker may be used to track the key object.

At initialising step 403, a frame counter configured within the memory 106 is initialised to one (1) under execution of the processor 105.

Then at selecting step 404, the location of the key object in a first frame of the video frames is tracked under execution of the processor 105. The geometric tracker may be used to track the bounding box around the object.

In a another implementation, the key object is tracked using a visual signature tracker, where a visual signature is an appearance model of the object, which in one case, is a colour histogram of the object. Mean-shift tracking, as described in D. Comaniciu, V. Ramesh, P. Meer, Kernel-based object tracking, IEEE Transactions on Pattern Analysis and Machine Intelligence Vol. 25 #5, May 2003, may be used at step 404.

As the object is tracked, a two-dimensional (2D) position of the object is also tracked through the frames. In one arrangement, the centroid of the object is tracked. In another arrangement, the midpoint of the base of the bounding box is tracked.

The output of step 404 is an array of two-dimensional (2D) coordinates of the tracked object.

The method 400 continues at a next frame fetching step 405, where a next one of the video frames is fetched under execution of the processor 105 and may be stored in the memory 106.

At decision step 406, if the current frame is the last frame, then control passes to steps 408 and 407. Otherwise, if the next frame is not the last frame, then the control returns to step 404 and the tracking of the key object in the next frame continues.

At motion path determining step 408, the global motion path is determined under execution of the processor 105. The array of two dimensional (2D) coordinates, which is the trajectory of the key object tracked in steps 404-406, may be used as the motion path. Alternatively, a best-fit path of the trajectory or a smoothed path of the trajectory may be used as the motion path. An example of the motion path is shown in FIG. 8A, which shows the motion path 801 of a person skateboarding 803. FIG. 11 shows the motion path 1101 of a person 1102 diving. The motion path 1101 is obtained by considering all the frames in the video as the global motion path.

At step 407, the global motion characteristics are determined under execution of the processor 105. In one implementation, the global motion characteristics are determined as the average velocity of the key object, its position, the number of times that the key object has changed direction, and the randomness of motion of the key object. The global motion characteristics may be stored in the memory 106.

Velocity is determined by using the 2D coordinates and frames for time. Direction and randomness can also be determined by the position (2D coordinates of the key object). In one example randomness is the entropy of the velocity of the key object.

At determining step 409, the local motion paths are determined using the global motion path from step 408 and the global characteristics from step 407. The local motion path is the motion path obtained by considering only a subset of (consecutive) frames of the motion path (i.e., LocalMotionPath=Segment (GlobalMotionPath)). The local motion paths determined at step 409 may be stored in the memory 106 under execution of the processor 105.

In one implementation, the global motion path is the local motion path. The global motion path may be divided into local motion paths by considering direction changes of the key object.

In another implementation, a part or section of the global motion path, where the key object moves in the same direction, is a local motion path. Alternatively, the global motion path may be segmented by considering an average speed of the key object. For example, a part or section of the global motion path, where the key object has the same average velocity, is selected as a local motion path.

In one implementation, a combination of features such as speed and direction are considered. For example, in the example of FIG. 11, there are three local motion paths generated based on the direction of travel of the key object 1102. The first local motion path ends at 1109 where the diver is running on the platform in one direction, the second local motion path is between 1109 and 1110 and third local motion path is between 1110 and 1111.

At 1104, which is close to local motion path 1109, the diver is starting to jump (i.e., change in direction) and at 1110 the diver is performing a somersault (i.e., change in direction) and at 1111, the diver has fallen into the water with a splash.

The method 400 concludes at determining step 410, where the local motion characteristics are determined from the local motion path, similarly to step 407. The determined local motion characteristics may be stored in the memory 106 under execution of the processor 105.

In an alternative to the method 400 described in FIG. 4, the global motion characteristics are not determined as in step 407, but are instead determined later using the local motion path or local motion characteristics determined in steps 409 and 410. For example, the randomness of the global motion path is determined from the number of local motion paths, or from the variability of the local motion characteristics compared between different local motion paths.

Figure 5:
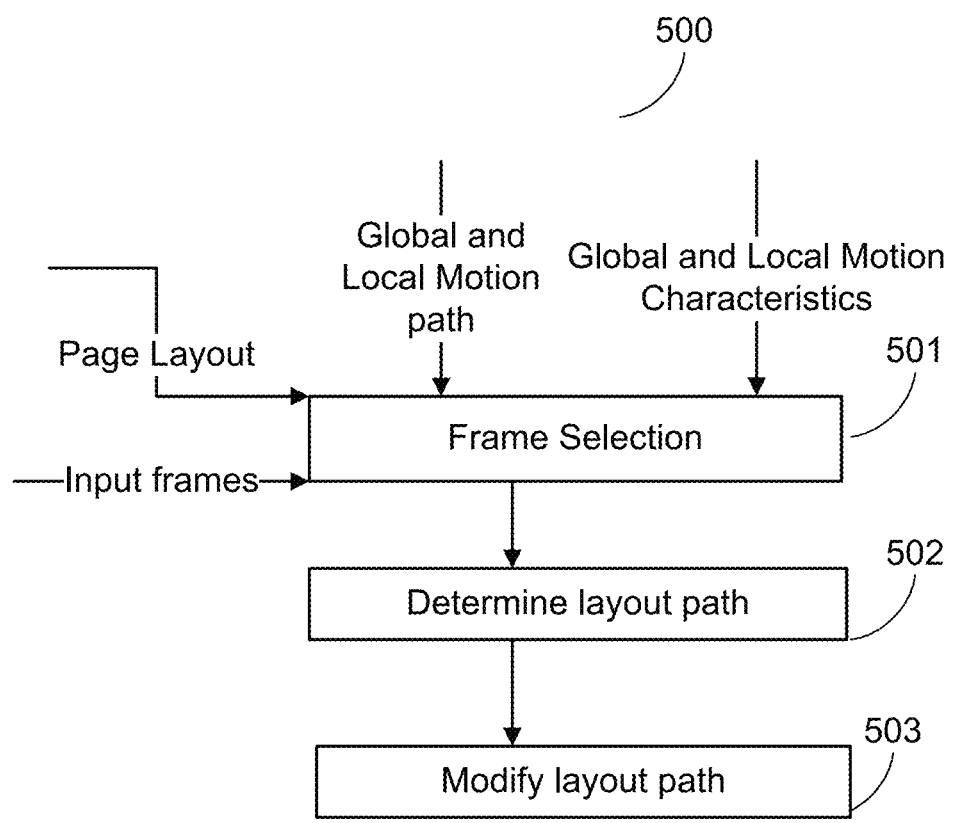
FIG. 5 is a flow diagram showing a method of determining a layout path.

The method 500 of determining the layout path, as executed at step 303, will now be described with reference to FIG. 5. The method 500 determines the layout path from the motion path determined in accordance with the method 400. The inputs to the method 500 are the outputs of the method 400 including the layout region, video frames, global motion path, local motion paths, global motion characteristics and local motion path characteristics.

The method 500 may be implemented as one or more software code modules of the software application program 133 resident in the hard disk drive 110 being controlled in its execution by the processor 105.

The method 500 starts in selecting step 501, where one or more of the video frames obtained from decoding the video are selected for the photo book, under execution of the processor 105. The selected video frames may be stored in the memory 106 under execution of the processor 105.

In one implementation, global and local motion characteristics are considered for frame selection. In another implementation, if the global motion characteristics show low motion randomness, frames at constant intervals are considered. For example, if the motion of the key object does not show any variation in speed and direction, then the frame count may be determined in accordance with Equation (1), as follows:

$$\text{frame count} = (\text{length of global motion path})/(\text{spacing}), \quad (1)$$

where the spacing is a distance (e.g. 10 cm) and is user defined and the length of a global motion path is another distance. The frames are selected at the given spacing along the global motion path. If the quality of the frame at the frame interval is not good, then a next best frame in sequence is selected at step 501.

In another implementation, if the global motion characteristics show medium motion randomness, frames at locations where the key object exhibits a sudden change in motion such as direction, speed, acceleration or entropy are considered for selection at step 501. The selection of the video frames may therefore be determined by the speed of the key object, for example.

In another implementation, if the global motion characteristics show high motion randomness, both global and local motion characteristics are used to determine the number of frames.

The local motion paths may be weighted by considering the number of changes in direction. For example, if a local motion path has the key object change its direction three (3) times, and in another local motion path the key object changes direction two (2) times, the former local motion path is weighted more than the later one.

In one implementation, the local motion paths may be weighted by motion type. For example, local motion path is weighted more if the motion type is "fast motion" than if the motion is "slow motion".

In another implementation, the local motion path is weighted uniformly (no weighting).

The spacings of the frames and the number of frames selected at step 501 are determined from the weights of the local motion paths and the local motion characteristics of that local motion path. If the local motion path is weighted more and if the motion type is "fast motion", then more frames with less spacing between the frames are considered for that path. If the local motion path is weighted less and if the motion type is "slow motion" then fewer frames with more spacing between the frames are considered in that path.

In another implementation, frames which belong to a certain event are selected at step 501. For example, event segmentation of the frames may be used to obtain frames which belong to a certain event such as a wedding event. An example of event segmentation which may be used at step 501 is described in the paper by Medioni et al, titled "Event detection and analysis from video streams." *Pattern Analysis and Machine Intelligence, IEEE Transactions on* 23, no. 8 (2001): 873-889.

In another implementation, frames belonging to a certain action, such as blowing out of a candle at a birthday party, may be selected at step 501. An example of action recognition which may be used at step 501 is described in the paper by Robertson et al, titled "A general method of human activity recognition in video", *Computer Vision and Image Understanding* 104, no. 2 (2006): 232-248.

In another implementation, frames containing a certain individual or frames in which the face of the individual is visible or has certain characteristics, such as smiling, are selected at step 501.

Alternatively, frames which have a certain image quality (e.g., frames which are not blurry and not washed out), are selected at step 501.

In still another implementation, an interaction of a secondary object with the key object is considered for frame selection at step 501. For example, the frames in which a secondary object (e.g., a groom) dancing with the key object (e.g., a bride) in a wedding dance are selected at step 501.

Out of the frames selected using any of the above implementation methods, a set of frames containing a salient frame and neighbouring frames of the salient frame are selected at step 501. The neighbouring frames include pre-salient frames (i.e., frames before the salient frame) and post-salient frames (i.e., frames after the salient frame).

A salient frame is a frame in which the key object exhibits a sudden change in motion pattern; such as where the key object changes direction, speed or shape (e.g., a change in a person's body shape). For example, the object may accelerate. The salient frame may therefore be selected by determining the sudden change in motion of the object.

For example, in FIG. 8B, frame 823 is the salient frame, as the key object (i.e., skateboarder 803), changes direction at the point 813 as indicated in the motion path 801. Frames before the salient frame 823 including frame 820, 821 and 822 are the pre-salient frames and frames 824 and 825 are the post-salient frames. The frames before the salient frame 823 and the frames after the salient frame 823 are present on the layout path 816 at anchor points 810, 811, 812, 814 and 815, corresponding to positions 830, 831, 832, 833, 834, 835 respectively on motion path 801. In one implementation, the pre-salient frames and post-salient frames may be selected at step 501 by considering the global and local motion characteristics and non-motion characteristics.

At determining step 502, the layout path is determined from the motion path determined at step 302, under execution of the processor 105. The input to step 502 is the global motion path. The local motion paths are then mapped to the layout path. The sections on the layout path corresponding to the local motion paths are the local layout paths. When describing the subdivision of the layout path into local layout paths, the term "global layout path" is used below to refer to a complete, undivided layout path.

In one implementation, the layout path determined at step 502 exactly matches the motion path. For example, the motion path 1101 in FIG. 11 may be used directly as a layout path.

In an alternative implementation, the layout path is part of the motion path. For example, if the motion path is a circle, the layout path is a semi-circular arc.

The method 500 continues at modifying step 503, where the layout path determined in step 502 is modified, under execution of the processor 105, to suit the layout region (e.g., 802) and the number of frames which are input to the method 500. The modified layout is determined by modifying the layout path determined at step 502. When the layout paths are modified, the local layout paths are modified as well. The local motion characteristics of the local layout paths correspond to the local motion characteristics of the local motion paths.

In one implementation, the layout path determined at step 502 is scaled up or down to fit the layout region (e.g., 802). For example, if the motion path is a 2-dimensional path with an overall width of 10 cm, and if the layout region has a width of 20 cm, the layout path may be stretched two times horizontally.

In one implementation, the layout path determined at step 502 may be adjusted to make the layout path symmetrical in the horizontal or vertical axis of the page. Further, the layout path may be stretched to fit the layout region and the number of frames.

In another alternative implementation, the angle of part of the layout path is modified to suit the local motion characteristics of frames corresponding to the region of the motion path associated with that part of the layout path. The local motion characteristics of the key object in the frame are used to alter the angle of the path. If the local motion characteristics have high acceleration or direction entropy, then the angle of the layout path is modified as a function of the local motion characteristics. For example if the entropy of velocity of the key object is Ev, then the angle is Ev*theta where theta is a number of degrees (e.g., for ten (10) degrees).

Further, the local motion characteristics, particularly local randomness of movement or specifically local entropy, are used to modify the layout path at step 503. For example, if a dancing couple are moving in such a way that the entropy at a position is very high (i.e., a lot of randomness in the movement), the layout can be stretched out as a function of the randomness of movement at that point.

Figure 12A:
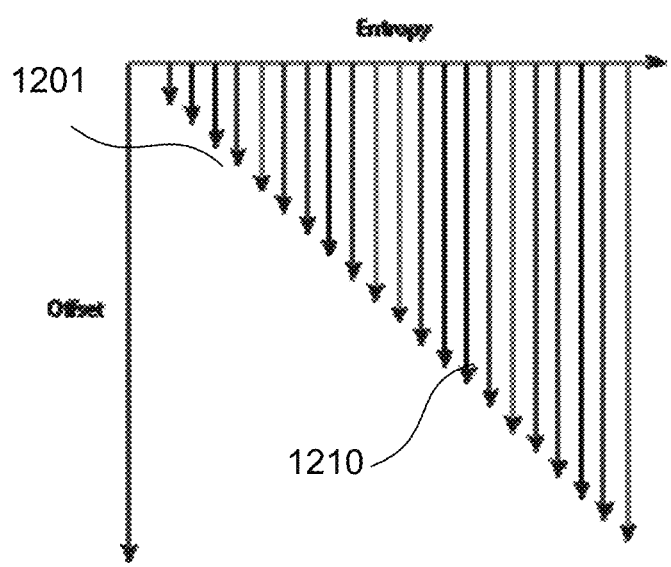
FIG. 12A is a graph which has entropy on the X-axis and offset on the Y-axis, and expresses offset as a function of entropy.
Figure 12B:
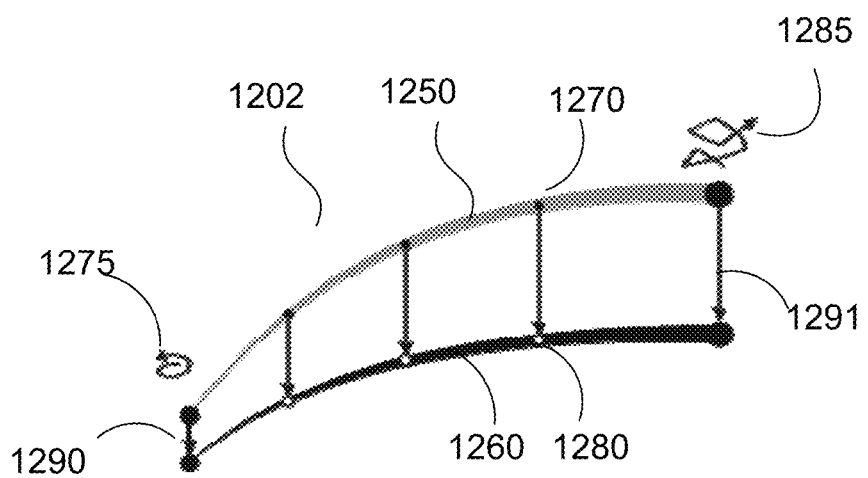
FIG. 12B shows a layout path modified into a modified layout path.

In one implementation, the offset can be modified using the entropy of velocity of the key object. For example, FIG. 12A shows a graph which has entropy on the X-axis and offset on the Y-axis. As entropy increases, the offset also increases linearly. In FIG. 12B, layout path 1250 is initially the same as the motion path. In the example of FIG. 12B, layout path 1250 is modified into the layout path 1260 by applying the offsets 1290 corresponding to the points 1270 on the original layout path to determine the points 1280 on the modified layout path. In the example of FIG. 12B, reference 1275 indicates low entropy and reference 1285 indicates high entropy. Hence, the offset 1290 is smaller than offset 1291.

In an alternative implementation, the layout path determined at step 502 may be smoothed at step 503 using a low pass filter, based on the global and local motion characteristics. For example, if the motion characteristics show high irregularity, the irregularity is smoothed using a low pass filter, to make the layout path regular.

A template with pre-defined aesthetically pleasing paths may be used at step 503 to modify the layout path determined at step 502. The layout may be modified at step 503 to match the pre-defined path as specified in the template.

In one implementation, the path determined at step 502 may be decomposed into components at step 503. For example, the path determined at step 502 may be decomposed into horizontal and vertical components, and one of the components may be used, while the other component is replaced with progression as a function of time, to match the layout region and also to emphasise the time aspect of the layout.

In one implementation, the layout path may be modified by spatially separating an overlapping portion of the motion path.

Figure 9A:
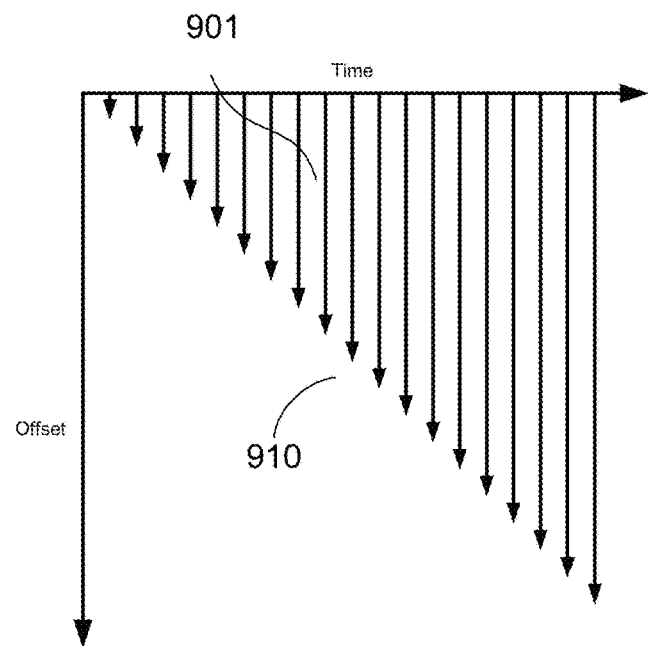
FIG. 9A is a graph which has time on the X-axis and offset on the Y-axis, and expresses offset as a function of time.
Figure 9B:
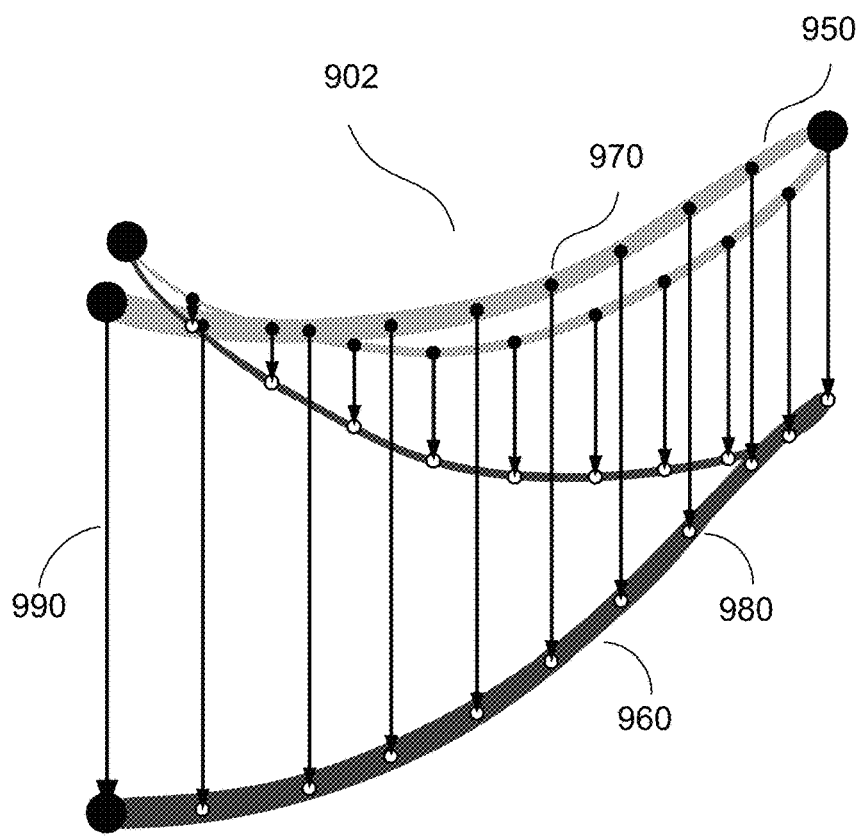
FIG. 9B shows a layout path created by applying offsets to a motion path, where the offsets are determined using the function shown in FIG. 9A.

The layout path may also be modified by changing the position of the motion path in a direction by adding an offset function of time in that direction. In one implementation, the layout path may be determined by applying an offset to the motion path in the direction of acceleration between each pair of neighbouring selected frames. The motion path is modified to include an offset function in the direction of acceleration between each pair of neighbouring selected frames. FIGS. 9A and 9B show an example of how in one implementation, the offset can be modified with time. FIG. 9A is a graph which has time on the X-axis and offset on the Y-axis. As time increases, the offset also increases linearly in the implementation of FIGS. 9A and 9B. In the example of FIGS. 9A and 9B, the layout path is initially the same as the motion path 950. The initial layout path 950 is modified into the layout path 960 by applying offsets 990 corresponding to the points 970 on the original layout path to determine the points 980 on the modified layout path.

In one implementation, the layout path may be modified to distribute white space in the layout to express motion. For example, the shape of the path may be adjusted so that there is more white space between frames in regions where motion is fast or less variable, and there is less space where motion is slow or highly variable.

In an alternative implementation, the layout path may be modified to use white space to express distance. For example, the layout path may be adjusted to be higher in the layout region, with white space beneath the layout path, when the activity is occurring further from a camera.

The layout path may be adjusted so that white space expresses asymmetry in motion. For example, when the motion is asymmetric, the layout path is positioned so that there is more white space to one side of the layout path.

In an alternative implementation of the method 500, the step of modifying the layout may be combined with creating the layout path. The modified layout path may be directly created from the motion path, without going through the intermediate step of first creating it and then modifying it.

Figure 6:
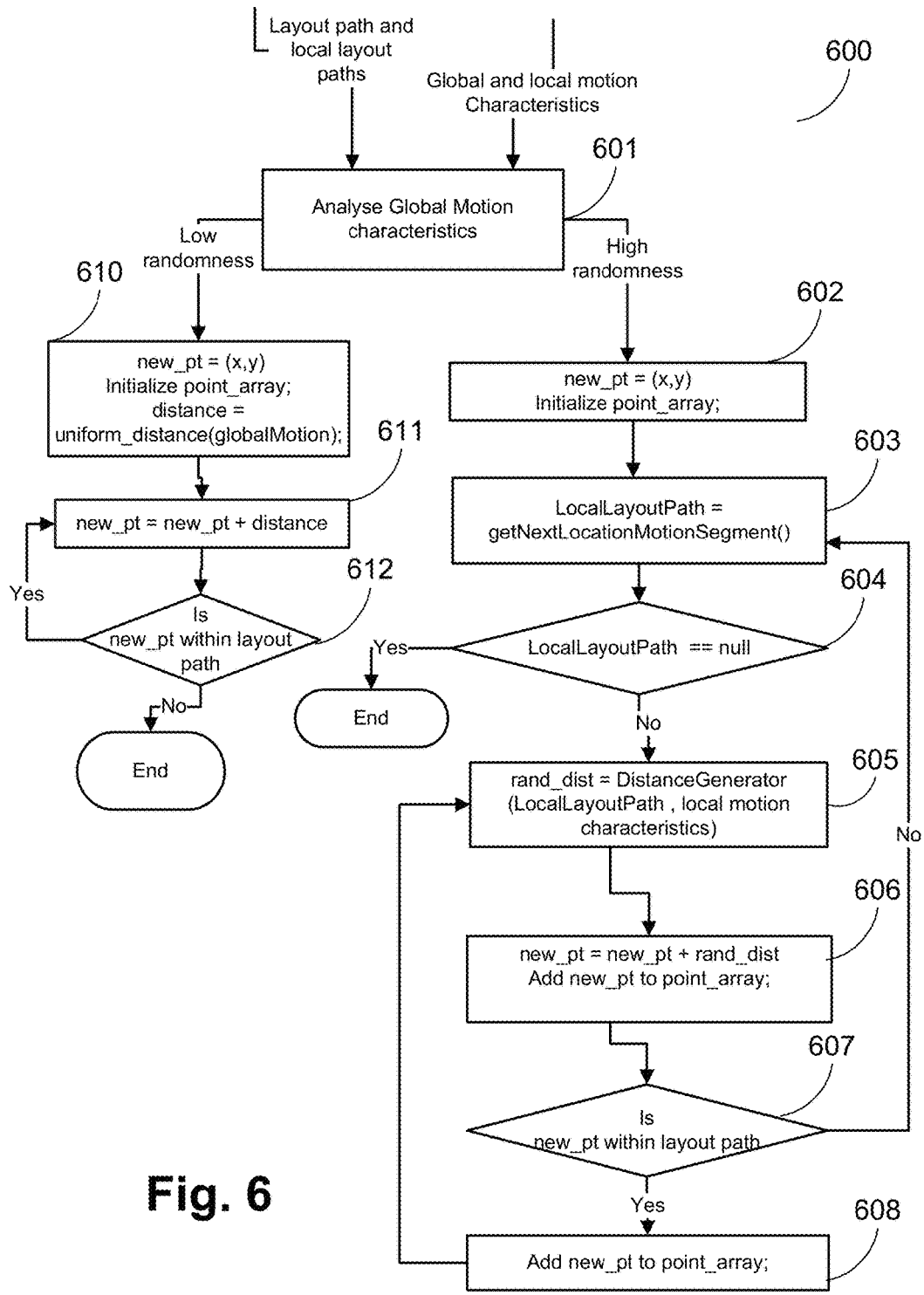
FIG. 6 is a flow diagram showing a method of determining anchor points.

The method 600 of determining anchor points, as executed at step 304, will now be described with reference to FIG. 6. The method 600 determines the position of anchor points on the layout path determined in step 303. The inputs to the method 600 are the global motion characteristics and local motion characteristics from the method 400. The inputs also include local layout paths and the global layout path from the method 500.

The method 600 may be implemented as one or more software code modules of the software application program 133 resident in the hard disk drive 110 being controlled in its execution by the processor 105.

The method 600 begins at analysing step 601, where the local and global motion characteristics determined in step 302, and a global layout path and local layout paths determined in step 303 are accessed (e.g., from memory 106) under execution of the processor 105. If the global motion characteristics of the key object have a high degree of randomness in movement (e.g., a high entropy of motion velocity (i.e., magnitude and direction)), then the control flows to initialising step 602.

In step 602, a new anchor "new_pt" point configured within the memory 106 is initialized (i.e., new_pt=(x,y)). Also at step 602, point array "point_array" is configured within the memory 106 and initialised to store the anchor points.

The method 600 continues at the obtaining step 603, where the next local layout path is obtained under execution of the processor 105 (i.e., LocalLayoutPath=getNextLocationMotionSegment( )).

Then at decision step 604, if the local layout path obtained is determined to be null (i.e., LocalLayoutPath==null), then the method 600 concludes. Otherwise, the control flows to generating step 605.

At generating step 605, a distance, "rand_dist", to a next anchor point is generated based on the local layout path and the motion characteristics of the key object (i.e., rand_dist=DistanceGenerator (LocalLayoutPath, local motion characteristics)). In one implementation, a function called DistanceGenerator with local motion characteristics and a local layout path as parameters is called under execution of the processor 105. The random distance "rand_dist" may be a constant for the local layout path.

In another implementation, "rand_dist" is dependent on average velocity of the key object. If the key object has high average velocity in that local layout path, then the distance between the anchor points is closer. If the key object has low average velocity, then there is larger distance between the anchor points.

In an alternative implementation, the random distance is generated by randomness of the local motion characteristics of the local layout path. For example, if "rand_dist" is based on the entropy of the local motion characteristics of the local layout path, then "rand_dist" is different each time, where the anchor points are placed at random points and are not at equal distances.

In one implementation, the random distance generator considers the change in direction by the key object at the anchor points. If there is change in direction, then the random distance is determined as a function of the change in direction. For example, if the direction changes by thirty (30) degrees, then the distance is three (3) cm.

The output of step 605 is the distance that is generated based on the local motion characteristics. For example, if the local layout path is twenty (20) cm long, the anchor points are placed every ten (10) cm if the average velocity is thirty (30) km/h (i.e., low). However, if the average velocity is higher, such as sixty (60) km/h, then the anchor points are placed every five (5) cm.

The method 600 continues at generating step 606, where the new anchor point is generated under execution of the processor 105. In one implementation, the distance "rand_dist" from step 605 is added to the previous anchor point "new_pt" (i.e., new_pt=new_pt+rand_dist). The new anchor point may be added to the anchor point array (i.e., Add new_pt to point_array) configured within memory 106.

In decision step 607, if the new point, new_pt, is not on the local layout path, then the control flow returns to step 603, to obtain the next local layout path. Otherwise, if the new point is on the local layout path, then the control flows to step 608 where the anchor point gets added to the array configured within memory 106. The control returns to step 605 following step 608.

At step 601, if the global motion characteristics of the key object show a low level of motion randomness, then control flows to initialisation step 610. As the randomness of motion is low, the anchor points are generated at equal spacings. In step 610, the new point new_pt is initialised (i.e., new_pt= (x,y)). Also at step 610, point array "point_array" is configured within the memory 106 and initialised to store the anchor points. The distance is generated at step 610 by considering the global motion characteristics (i.e., distance=uniform_distance(globalMotion)). In one implementation, the average velocity of the global motion of the key object is considered and the distance is generated as a function of that average velocity. For example, if the average velocity is thirty (30) km/h the distance is three (3) cm and an anchor point is generated every three (3) cm. The control then passes to generating step 611.

In step 611, the new anchor point is generated by adding the distance to the previous anchor point (i.e., new_pt=new_pt+distance). In one implementation, the distance may be used to modify just the X coordinate. In another implementation, the distance is used to modify just the Y coordinate. In yet another implementation, the distance is used to modify both coordinates, for example, by traversing the path by the distance along the path, and using the X and Y coordinates of the resulting point.

At decision step 612, if the new coordinate is not on the layout path, then the method 600 concludes. Otherwise, the method 600 returns to step 611.

Figure 7:
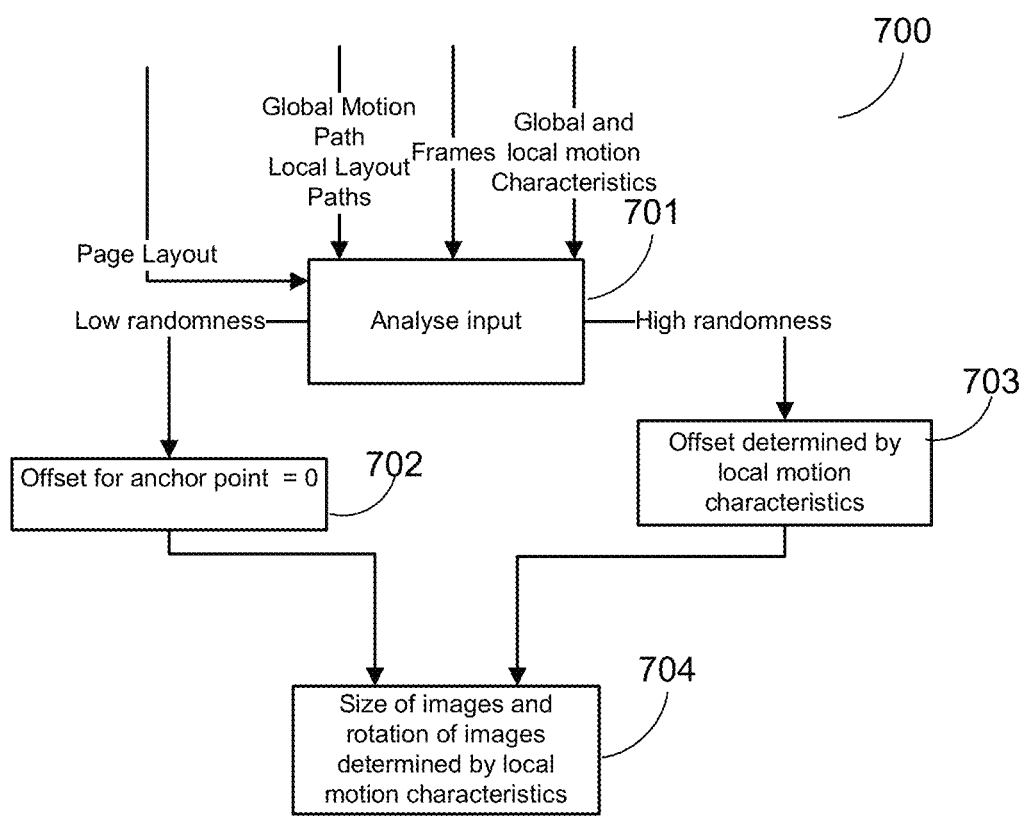
FIG. 7 is a flow diagram showing a method of determining offsets and frame characteristics.

The method 700 of determining offsets and frame characteristics, as executed at step 305, will be described with reference to FIG. 7. The inputs to the method 700 include the global motion characteristics and local motion characteristics determined at step 302 in accordance with the method 400. The inputs to the method 700 also include layout paths (global and local) determined at step 303 in accordance with the method 500. The inputs to the method 700 also include the anchor points determined at step 304 in accordance with the method 600 and the frames (salient frame, pre-salient frames and post-salient frames) from step 303 determined in accordance with the method 500. The inputs to the method 700 also include the layout region which is input to method 300.

The method 700 may be implemented as one or more software code modules of the software application program 133 resident in the hard disk drive 110 being controlled in its execution by the processor 105.

The method 700 begins at analysing step 701, where the global motion characteristics of the key object are analysed. The maximum allowed absolute angle deviation theta_dev and maximum allowed absolute size deviation s_dev, scale factor min_size and max_size are initialized within memory 106 under execution of the processor 105.

The min_size and max_size of the frames may be determined by the layout region and number of frames. In one implementation, max_size may be determined in accordance with Equation (2), as follows:

max_size=width or height of layout region/number of frames−(number of frames*buffer)　　(2)

where buffer is an integer (e.g., ten (10)).

Width and height of min_size in one implementation may be set by width or height in accordance with Equation (3) as follows:

max_size/number of frames.　　(3)

If there is a low level of randomness of the global motion characteristics of the key object (e.g., if the velocity entropy is less than 0.5 in the range 0 to 1), then the control flows to determining step 702. In step 702, the anchor points are shifted by an offset under execution of the processor 105. The offset from the anchor points is to set to zero or a constant such as 0.2, below or above the layout path.

If there is a high degree of randomness of the global motion characteristics, for example, if the entropy of velocity is more than 0.6 in the range from 0 to 1, then control flows to determining step 703.

At step 703, the offset from the local motion characteristics of the frames around the salient frame are determined under execution of the processor 105. In one implementation, the offset is a function of the randomness. For example, if the velocity entropy of the key object is high, then the offset is a random number between 0 and 1, and the anchor points are shifted by the offset randomly below and above the layout path. For example, the offset may be 0.5 above the layout path from one anchor point and be 0.2 below the layout path for the next anchor point.

At determining step 704, the size and the angle of rotation of images are determined as follows in one implementation, when the randomness is low. A base size is determined for each frame according to a position in the frame sequence and the position of the salient frame.

For each frame (i) less than the salient frame (i_k) and total number of frames is (N), the size of the frame basesize_i is determined in accordance with Equation (4), as follows:

$$basesize\_i = s\_min*(i\_k-i)/i\_k + s\_max*(i/i\_k) \quad (4)$$

For each frame (i) greater than the salient frame (i_k), the size of the frame basesize_i is determined in accordance with Equation (5) as follows:

$$base\_size = s\_min*(i-i\_k)/(N-i\_k) + s\_max*(N-i)/(N-i\_k) \quad (5)$$

with rand( ) returning random number in range [0,1] for each frame (i), the size (size_i) and angle of rotation of frame (angle_i) is determined using Equations (6) and (7), as follows:

$$size\_i = basesize\_i + (basesize\_i/s\_max)*(rand(\ )*2-1)*r*s\_dev \quad (6)$$

$$angle\_i = (rand(\ )*2-1)*r*theta\_dev \quad (7)$$

The frames are cropped or scaled to match the sizes as determined above. In one implementation, the rotation of the frames is zero. In another implementation, rotation of the frame is in the direction of the movement of the key object.

If the randomness is high, then the sizes of the frames vary between the s_min and s_max. The rotation of the frame is also random, where each frame is rotated at a different angle to the previous one.

In another implementation, the size of the frames may vary linearly with the randomness. As the randomness, for example, entropy of velocity or image entropy, increases the size also increases. For example, FIG. 11A shows the motion path 1101 of a person diving. The entropy of motion is highest at position 1114 and medium at 1106 and low at 1102 and 1104.

FIG. 11B shows the final layout 1115, with the layout path 1116. Frames 1120, 1121, 1130 and 1140 shown in FIG. 11B in layout path 1116 matches 1104, 1105, 1106 and 1114 in the motion path 1101 of FIG. 11A. The size of frame 1140 is biggest, as at the location of the frame 1140, the motion entropy and image entropy both increase, because of the splash shown in the frame 1140.

At frame 1130, the entropy is medium, because of the somersault, and at all other locations the entropy is low. Hence, in the example of FIG. 11B, the frame sizes of frames 1120, 1121 and 1122 are gradually increasing.

Figure 10B:
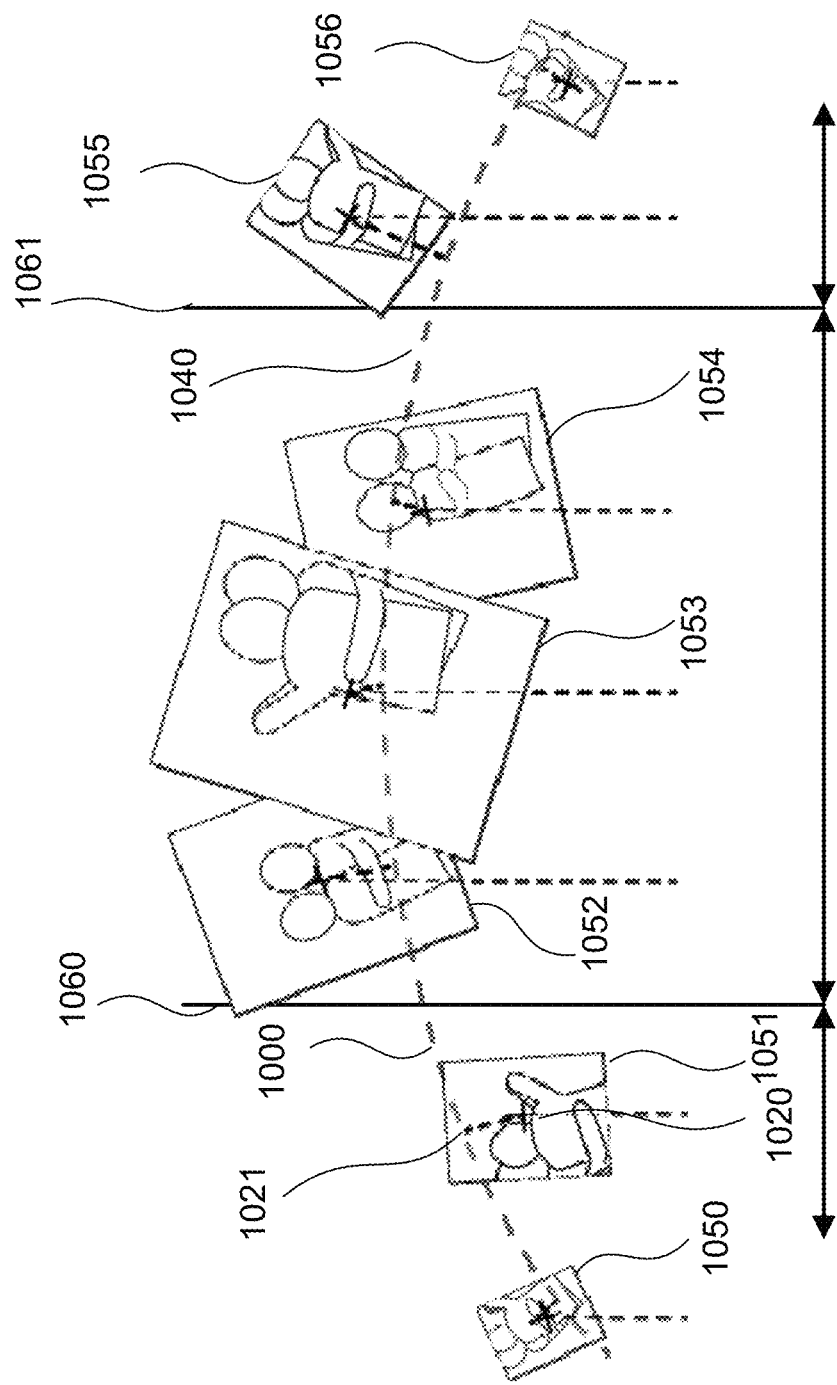
FIG. 10B shows an example of video frames arranged on the layout path using frame characteristics, including frame offsets and rotation.

FIG. 10A and FIG. 10B show examples of video frames (or images) spatially arranged on a layout path 1000 and a layout path 1040. The layout paths 1000 and 1040 are modified layout paths obtained from a motion path.

FIG. 10A shows an example anchor point 1010 shown on the layout path 1000. The anchor point 1010 is placed on the layout path 1000. Frames 1001, 1002, 1003, 1004 and 1005 are all frames increasing in size as per the algorithm described above when the randomness is low and the anchor points are equidistant from each other, with zero offset.

In FIG. 10B, as there is higher randomness in dancing motion, frames 1050, 1051, 1052, 1053, 1054, 1055 and 1056 are frames of varied sizes and at varied rotations.

As seen in FIG. 10B, anchor point 1021 is an original anchor point and anchor point 1020 is a new anchor point at an offset from anchor point 1021. Frame 1051 is placed with 1020 as the centre. Similarly, other frame offsets are above and below the layout path 1000, based on the local motion characteristics, as the motion is random. For example, frame 1052 has an offset above the layout path 1000 and frame 1054 is below the layout path.

In another implementation, instead of varying the size and angle of the frames, the colour of the frames is varied. The salient frame may be shown in full original colour. The pre-salient frames may be shown with saturation increasing towards the salient frame and the post-salient frames may be shown with saturation decreasing away from the salient frame.

In one implementation, Z-order is used to enhance the layout of frames. For example, the pre-salient frames and post-salient frames have a lower Z-order position than the salient frame, and descend in Z-order sequence away from the salient frame.

In an alternative implementation, the transparency of the frames may be modified, so that the salient frame is opaque, and the pre-salient and post-salient frames have increasing transparency leading away from the salient frame.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

We claim:

1. A processor-implemented method for spatially arranging a plurality of video frames for display on a layout region, said method comprising:
    analyzing a video sequence to determine a motion path followed by at least one object within the video sequence over a duration of the analyzed video sequence;
    selecting, from within the analyzed video sequence, a set of video frames as the plurality of video frames based on the determined motion path of the at least one object within the analyzed video sequence;
    creating, using the determined motion path, an image layout path for the selected video frames;
    determining a position of each of the plurality of video frames along the created image layout path based on the determined motion path of the object and at least one motion characteristic of the at least one object within each of the plurality of video frames;
    generating an anchor point for each selected video frame corresponding to the determined position, each said anchor point locating a selected video frame along the created layout path; and
    spatially arranging the selected plurality of video frames within the layout region relative to the created image layout path using the generated anchor points.

2. The method according to claim 1, further comprising determining a frame display characteristic for each of the selected video frames dependent on irregularity of the motion of the object.

3. The method according to claim 2, wherein the selected plurality of video frames are arranged in accordance with the determined frame display characteristic.

4. The method according to claim 2, wherein the frame display characteristic is one or more of the group comprising: relative size of a frame, angle of rotation of the frame, transparency of the frame, hue of the frame, saturation of the frame, offset of the frame from layout path, distortion of the frame, cropping of the frame and contrast of the frame.

5. The method according to claim 1, wherein a shape of the motion path is modified to create the layout path, the modification being based on a shape characteristic of the motion path.

6. The method according to 1, wherein said video frames are spatially arranged with respect to the relative motion of the object in the video frames.

7. The method according to claim 1, further comprising spatially separating an overlapping portion of the motion path.

8. The method according to claim 1, further comprising changing the position of the motion path in a direction by adding a function of time in said direction.

9. The method according to claim 1, further comprising modifying the motion path to include an offset in a direction of acceleration between each pair of neighbouring selected frames.

10. The method according to claim 1, wherein at least one of size and overlap of the arranged video frames is determined based the motion of the object.

11. The method according to claim 1, further comprising adjusting one or more frame display characteristics based on irregularity of the motion of the object.

12. The method according to claim 1, wherein the motion path is determined based on at least one of trajectory of the object, and relative position between a moving object and a still background.

13. The method according to claim 1, further comprising selecting a salient frame and then selecting neighbouring frames of the salient frame.

14. The method according to claim 13, wherein the salient frame is selected by determining a sudden change in motion of the object.

15. The method according to claim 1, wherein selection of the video frames is determined by the speed of the object.

16. A system for spatially arranging a plurality of video frames for display on a layout region, said system comprising:
a memory for storing data and a computer program;
a processor coupled to the memory for executing the computer program, said computer program having instructions for:
analyzing a video sequence to determine a motion path followed by at least one object within the video sequence over a duration of the analyzed video sequence;
selecting, from within the analyzed video sequence, a set of video frames as the plurality of video frames based on the determined motion path of the at least one object within the video analyzed sequence;
creating, using the determined motion path, an image layout path for the selected video frames;
determining a position of each of the plurality of video frames along the created image layout path based on the determined motion path of the object and at least one motion characteristic of the at least one object within each of the plurality of video frames;
generating an anchor point for each selected video frame corresponding to the determined position, each said anchor point locating a selected video frame along the created layout path; and
spatially arranging the selected plurality of video frames within the layout region relative to the created image layout path using the generated anchor points.

17. A non-transitory computer readable medium having a computer program stored on the medium for a method of spatially arranging a plurality of video frames for display on a layout region, said method comprising:
analyzing a video sequence to determine a motion path followed by at least one object within the video sequence over a duration of the analyzed video sequence;
selecting, from within the analyzed video sequence, a set of video frames as the plurality of video frames based on the determined motion path of the at least one object within the video analyzed sequence;
creating, using the determined motion path, an image layout path for the selected video frames;
determining a position of each of the plurality of video frames along the created image layout path based on the determined motion path of the object and at least one motion characteristic of the at least one object within each of the plurality of video frames;
generating an anchor point for each selected video frame corresponding to the determined position, each said anchor point locating a selected video frame along the created layout path; and
spatially arranging the selected plurality of video frames within the layout region relative to the created image layout path using the generated anchor points.

18. A processor-implemented method for spatially arranging a plurality of video frames for display on a layout area, said method comprising the steps of:
analyzing a video sequence to determine a motion path followed by at least one object within the video sequence over a duration of the analyzed video sequence;
selecting, from within the analyzed video sequence, a set of frames as the plurality of video frames based on the determined motion path of the at least one object within the analyzed video sequence;
creating, using the determined motion path, an image layout path for the video frames;
determining a frame display characteristic for each of the selected video frames dependent on the irregularity of the motion; and
spatially arranging the selected plurality of video frames within the layout region relative to the created image layout path using the determined frame display characteristics.

19. The method according to claim 18, wherein the frame display characteristic is one or more selected from the group consisting of: relative size of a frame, angle of rotation of the frame, transparency of the frame, hue of the frame, saturation of the frame, offset of the frame from layout path, distortion of the frame, cropping of the frame and contrast of the frame.

20. A processor-implemented method for spatially arranging a plurality of video frames for display on a layout region, said method comprising the steps of:
- analyzing a video sequence to determine a motion path of an object within the video sequence over a duration of the analyzed video sequence;
- selecting, from within the analyzed video sequence, a set of video frames as the plurality of video frames based on the determined motion of an object within the video sequence;
- modifying a shape of the motion path to create an image layout path, wherein the modification is based on a shape characteristic of the motion path; and
- spatially arranging the selected plurality of video frames relative to the created image layout path, said video frames being positioned with respect to the relative motion of the object within the video frames.

21. The method according to claim 20, further comprising spatially separating an overlapping portion of the motion path.

22. The method according to claim 20, further comprising changing the position of the motion path in a direction by adding a function of time in said direction.

23. The method according to claim 20, further comprising modifying the motion path to include an offset in a direction of acceleration between each pair of neighbouring selected frames.

24. The method according to claim 20, wherein the motion path is determined based on at least one of trajectory of the object, and relative position between a moving object and a still background.

* * * * *